Nov. 18, 1941.                A. A. EWALD                2,263,293

QUICK ACTION COUPLING

Filed July 3, 1940

INVENTOR
ARNO. A. EWALD
BY
Wheeler, Wheeler & Wheeler
ATTORNEYS.

Patented Nov. 18, 1941

2,263,293

UNITED STATES PATENT OFFICE 2,263,293

QUICK ACTION COUPLING

Arno A. Ewald, Oakfield, Wis., assignor to Romort Manufacturing Company, Oakfield, Wis., a corporation of Wisconsin Application July 3, 1940, Serial No. 343,838

8 Claims. (Cl. 284—19)

My invention relates to improvements in quick action couplings for connecting lengths of hose or pipe.

My object is to provide a coupling composed of two telescoping members, which, when merely pushed together, will open a valve for fluid transmission and simultaneously become automatically locked, subject to release by manual pressure upon a push button.

Further objects are to provide a guard for the push button adapted to protect it from pressures other than that of the thumb or finger of the operator; to provide one of the members with a controlling valve which closes in the direction of fluid delivery,—preferably with the aid of a spring; to provide the valve containing member with a flexible valve seat adapted for sealing relationship with the nose of the insertable telescoping member on one side and with the valve on the other side when the insertable member is withdrawn; and in general to provide a simple inexpensive coupling for fluid delivery conduits, the members of which may be connected or disconnected without loss of time and with minimum manipulation of parts.

In the drawing.

Like parts are identified by the same reference characters throughout the several views.

Figure 1:
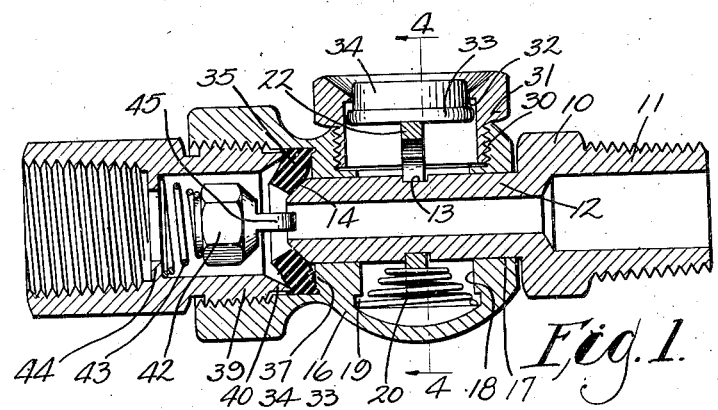
Figure 1 is a longitudinal sectional view of the assembled coupling members, drawn to a plane intersecting the axis of the fluid passage.

The male member 10 of my improved coupling has, at one end, a threaded portion 11 to receive a length of pipe or hose, and at the other end a tubular nose portion 12 provided with an intermediate exterior annular channel 13 and a tapered extremity 14. The receiving member 16 has an axial bore 17 for reception of the nose 12 of the other coupling member, and a transverse bore or socket 18 is undercut at 19 to provide a seating for a spiral spring 20. The bore 18 is provided with channels 22 to receive a slide 23, the side margins of which are receivable in the channels 22 and the lower margin of which bears upon the upper end of the spring 20. The slide also has a central aperture 26 of sufficient diameter to receive the nose portion 12 of the member 10, and this aperture has lobes extending in the direction of slide movement, and preferably having arcuately curved margins corresponding in curvature with that of the base of the channel 13 in the nose 12. The thickness of the slide is slightly less than the width of the channel 13, and the spring 20 normally holds the slide with the lobed portion 28 engaged in said channel, whereby the nose portion of the member 10 may be locked against withdrawal, subject to release by a downward movement of the slide against the pressure of the spring 20 until the aperture 26 is in full registry with the nose portion of the member 10.

The open end of the socket 18 is enlarged and threaded at 30 to receive a guard sleeve 31, internally shouldered at 32 for engagement with a flange 33 on the push button 34. The shoulder 32 serves as a stop to prevent the push button from being driven out of the sleeve by the spring 20 when the nose 12 is withdrawn.

A flexible annulus 35, preferably composed of rubber, is mounted in the receiving member 16 and seated against a shoulder 37. This annulus may be clamped in position by a sleeve 39 screwed into the receiving member 16, with its inner end portion 40 in clamping engagement with the outer marginal portion of the annulus.

A valve 42 is mounted in the sleeve 39 in seating engagement with a spiral spring 43. The outer end of the spring bears against the internal annular shoulder 44. The annulus 35 serves as a seat for the valve 42.

When the nose 12 of the telescoping coupling member is pushed into the receiving member until its channel 13 is in registry with the slide 23, the extremity of the nose 12 engages a projection 45 on the valve 42 and pushes the valve to open position, as shown in Figure 1. At the same time the tapered portion of the nose bears against the flexible annulus 35 to form a seal and effectively prevent fluid from escaping along the exterior surface of the nose, the apertured portion of the annulus being flexed, as clearly shown in Figure 1, whereby the latter obtains a broad annular bearing upon the tapered end portion of the nose.

The outer end of the sleeve 39 is internally threaded to provide means for coupling a pipe of a length of hose thereto.

Figure 2:
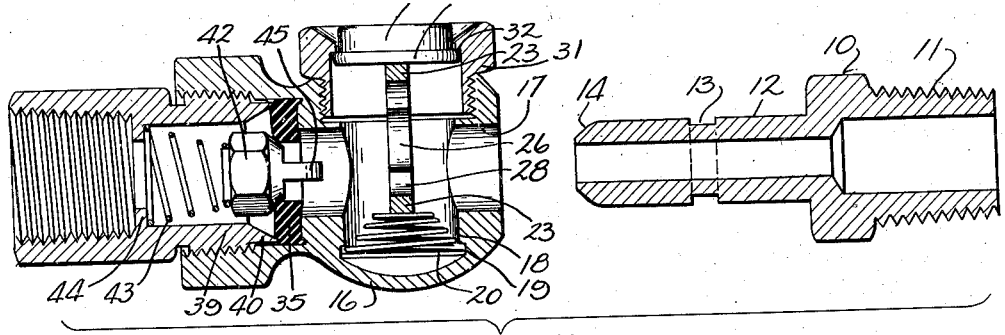
Figure 2 is a similar view showing the coupling members as they appear when separated.
Figure 3:
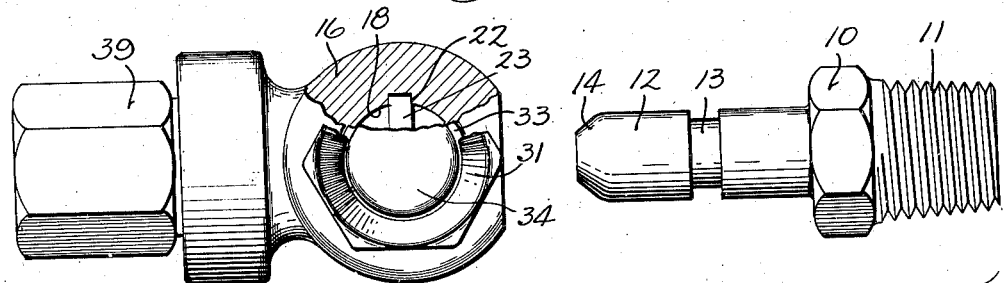
Figure 3 is a plan view of the separated parts, with the receiving member partially broken away to expose the locking slide.
Figure 4:
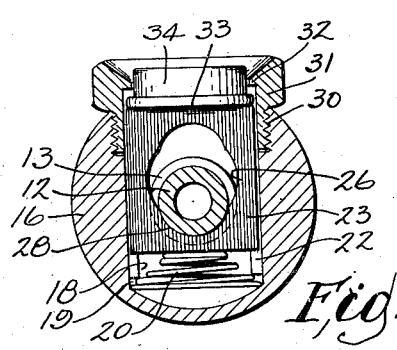
Figure 4 is a sectional view drawn to line 4—4 of Figure 1.
Figure 5:
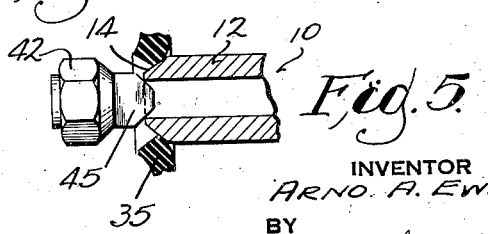
Figure 5 is a detail view of the valve, showing fragments of the valve seat and the insertable nose in section.

When the parts are uncoupled, as illustrated in Figure 2, the locking slide 23 will be urged by the spring 20 into engagement with the push button 34 and will force the push button outwardly until its flange 33 engages the shoulder 32.

But when the parts are to be re-coupled, the nose 12 is merely pushed into the bore 17 of the receiving member. The inner extremity of the nose is sufficiently tapered to allow it to enter the aperture 26 and force the slide against the spring 20 until the aperture 26 is in full registry with the nose. Thereupon continued inward movement of the nose opens the valve 42 and simultaneously seats the tapered portion of the nose against the flexible annulus 35. At this stage the slide registers with the channel 13 and the spring 20 pushes it in the direction of the push button until its motion is arrested by engagement of the margin of the lobe 28 with the nose at the base of the channel 13, thereby locking the coupling members together.

To release the coupling members it is merely necessary to exert manual pressure upon the push button 34, thereby compressing the spring 20 until the aperture 26 is in full registry with the nose of coupling member 10. The spring 43 then closes the valve and pushes the coupling member 10 outwardly until the channel 13 is out of registry with the slide, thus allowing the member 10 to be freely withdrawn.

When the members are coupled the push button is not held by the slide in engagement with the shoulder 32, and its protecting guard sleeve 31 may extend beyond the outer surface of the push button, as shown in Figure 1, whereby the coupling may be drawn along the ground without danger of having the push button accidentally pressed inwardly far enough to actuate the slide to a releasing position.

I claim:

1. A quick detachable ported coupling for lengths of hose or pipes, comprising the combination of a set of ported coupling members, one adapted to telescope within another, the inner telescoping member being provided with a channel intermediate of its ends and the other being provided with a wholly enclosed transversely movable apertured locking slide through which the inner member extends when in coupling position, the slide being adapted to enter said channel, and a spring adapted to urge said slide into the channel when the members are in coupling position, whereby said members may be automatically locked in such position.

2. A quick detachable ported coupling as set forth in claim 1, in which the outer telescopic member is provided with a push button adapted, when pressed inwardly, to retract the slide from the channel and allow the coupling members to separate.

3. In a coupling of the described class, the combination with a coupling member having an axial bore provided with parallel internal channels on opposite sides of the bore, of a transversely movable apertured slide plate extending across the bore, a spring socketed in said member and bearing upon one end of the plate to normally hold it in position for locking engagement with an associated coupling member, a guard sleeve enclosing the other end of the slide, and a push button in the guard sleeve adapted under manual pressure to actuate the slide in opposition to the pressure of said spring, said sleeve being adapted to protect the push button from accidental slide actuating pressures during locking engagement of the slide with an associated coupling member.

4. In a coupling of the described class, the combination of a coupling member having an axial bore and provided with an internal flexible annular valve seat, a spring actuated valve normally bearing on said seat and controlling the flow of fluid through said member, a wholly enclosed transversely movable slide plate extending across the bore and having an aperture substantially equal in size to that of the bore, said plate being normally held by the spring in a position with the aperture eccentric to the bore, a telescoping coupling member having a tapered end adapted to pass through the aperture to a valve opening position in sealing relation to the seat, said telescoping member having an annular channel adapted to receive the slide when said member is in full coupling position, a guard sleeve enclosing the end of the slide opposite the end against which the spring bears, and a push button in the guard sleeve adapted under manual pressure to actuate the slide in opposition to the spring to release the telescoping member and allow it to be pushed outwardly by said spring actuated valve.

5. In a coupling for lengths of hose or pipes, the combination with a pair of telescoping coupling members, a locking slide in one of the members adapted to engage the other when in full coupling position, a spring for actuating the slide to locking position, a push button for actuating the slide to releasing position, and a controlling valve adapted to be held in open position when the members are in full coupling relation, said slide and spring being wholly enclosed by the outer coupling member and the inner coupling member being adapted to move into sealing relation with the outer coupling member when the members are interlocked by said slide.

6. In a coupling for lengths of hose and pipes, the combination of an outer coupling member provided with an axial bore and an internal apertured slide movable transversely across said bore, a spring at one side of said bore for urging the slide in one direction, a push button socketed in said member at the other side of the bore for urging the slide in opposition to the spring, and a tubular coupling member having a tapered nose adapted to telescope within the first mentioned member and to pass through the aperture in the slide, said tapered portion being adapted to actuate the slide in opposition to its spring and said nose having a channel adapted for locking engagement with the slide when in registry therewith, and a sealing ring adapted to be engaged by said tapered nose when the slide is engaged in said channel.

7. A quick detachable coupling as set forth in claim 6, in which the slide carrying member is provided with a spring actuated valve normally engaged with the sealing ring and adapted to be pushed out of such engagement while the sealing ring is being engaged by the tapered nose of the other coupling member.

8. In a coupling of the described class, a coupling member having an axial bore internally shouldered in one direction to receive an annular valve seat, a spring actuated valve within the bore movable into engagement with one side of said seat, a transversely movable locking slide mounted within said member on the other side of said seat and provided with an aperture adapted for full or partial registry with the bore dependent upon the position of the slide, a spring for actuating the slide in one direction, and a push button adapted to be manually operated to press the slide in the other direction, said slide and spring being wholly enclosed within said member and adapted to interlock with a cooperating coupling member when the valve is in an open position.

ARNO A. EWALD.